June 13, 1967  J. D. DOREY  3,325,805

DIGITAL-TO-ANALOG CONVERTER

Filed June 16, 1964

INVENTOR.
JOHN D. DOREY
BY
*Robert J. Haan*
ATTORNEY

United States Patent Office 3,325,805
Patented June 13, 1967

3,325,805
DIGITAL-TO-ANALOG CONVERTER
John D. Dorey, Westmount, Quebec, Canada, assignor to Sperry Gyroscope Company of Canada, Ltd., Montreal, Quebec, Canada
Filed June 16, 1964, Ser. No. 375,444
Claims priority, application Canada, May 7, 1964, 902,266, Patent 741,014
10 Claims. (Cl. 340—347)

ABSTRACT OF THE DISCLOSURE

A digital-to-analog converter in which digital signals drive respective switches to allow weighted currents to flow through one or the other of two output resistors across which voltages are produced representing the sine and the cosine, respectively, of the angle represented by the digital signal. The currents are produced by a paralleled resistor network having one resistor more than the number of switches. The extra resistor permits a predetermined minimum current to flow through one of the output resistors at all times to permit quadrant boundary traversal without the introduction of angular error.

---

Figure 1:
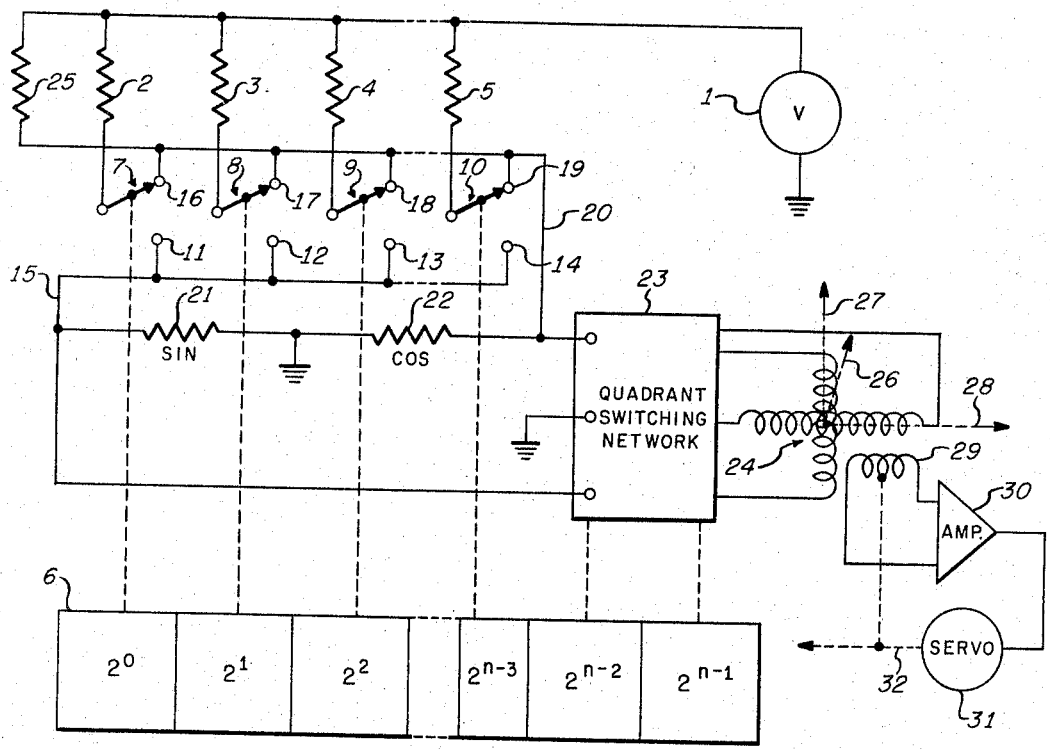

The present invention relates to devices for converting input digital data into equivalent output analog data, and more particularly, to a device for converting an input digital representation of an angle into an output analog voltage representation of the angle.

In servo control applications, for example, in machine tool position control systems, there frequently is need for a device responsive to input digital representations of an angle for controlling the angular position of an output shaft. A digital-to-analog converter for performing such a function is disclosed in copending patent application S.N. 34,568, filed June 7, 1960, in the name of Peter J. Herzl, now Patent 3,134,098, issued May 19, 1964, and assigned to the present assignee. Conventionally, input digital representations of a desired angle are converted into voltage approximations of the sine and cosine of the angle. The voltage approximations are coupled through a quadrant switching network to the input stator windings of a resolver whereby one of the stator windings is excited with a voltage approximately representing the sine of the desired angle and the other stator is excited with the voltage approximately representing the cosine of said angle. The flux resulting from the energization of the stator windings induces a voltage in the rotor winding of the resolver. The rotor winding voltage controls a servomechanism which drives the rotor winding to the angular position at which the rotor voltage is reduced to zero. In the steady-state condition, the angle assumed by the rotor winding is the analog equivalent of the angle represented by the input digital signal.

In accordance with the invention of the aforementioned patent, a relay-actuated pair of energized resistance networks is employed in the conversion of the input digital signal to approximate representations of the sine and cosine of the angle. In response to digital commands, the resistance of each of the networks and the voltages developed across them can be varied over a range from zero to a maximum value which depends upon the values of the circuit parameters. Inasmuch as the resistance networks shunt the resolver windings being driven, however, the wide range of resistance variation detracts from the efficiency of operation. The efficiency of operation also is somewhat reduced by an inherent design requirement of high network impedance which aggravates cross-coupling and other undesired effects between the sine and cosine signals generated by the resistance network pair.

One object of the present invention is to provide a digitally controlled impedance network requiring a minimum of impedance variation in the production of signals representing the sine and cosine of a desired angle.

Another object is to provide a digitally controlled impedance network for producing output voltages at low impedance level representing the sine and cosine, respectively, of a desired angle.

A further object is to provide a device of simple and reliable construction for converting input digital representations of an angle into voltages representing the sine and the cosine of said angle.

These and other objects of the present invention, as will appear from the reading of the following specification, are achieved in a typical embodiment by the provision of a resistance network controlled in accordance with digital input signals representing a desired angle. The network comprises a plurality of resistors having conductance values proportional to the weights of the $n-2$ least significant digits of the digital input signals where $n$ is the total number of digits. One terminal of each of the resistors is connected to a constant amplitude alternating signal source. The other end of each of the resistors is connected by means of a respective relay-actuated switch either to one terminal of a first output resistor or to one terminal of a second output resistor. The other terminals of the first and second output resistors are connected to each other and to ground.

The switches are activated in response to the $n-2$ least significant digits of the digital input signals. A quadrant switching network, responsive to the two most significant digits of the input signal establishes connections between the first and second output resistors and the stator windings of a resolver. The voltage induced in the rotor winding of the resolver energizes a servomechanism which drives the rotor winding to the angular position at which the rotor winding voltage reduces to zero. The accuracy with which the position of the rotor winding reproduces the angle represented by the digital input signals varies in accordance with a certain relationship between the admittance values of the resistors of the network and the admittance values of the first and second resistors. By appropriate selection of the parameter values, the null position of the resolver can be digitally programmed throughout a full 360° angular range to an accuracy of within ±2 minutes of arc.

Figure 2:
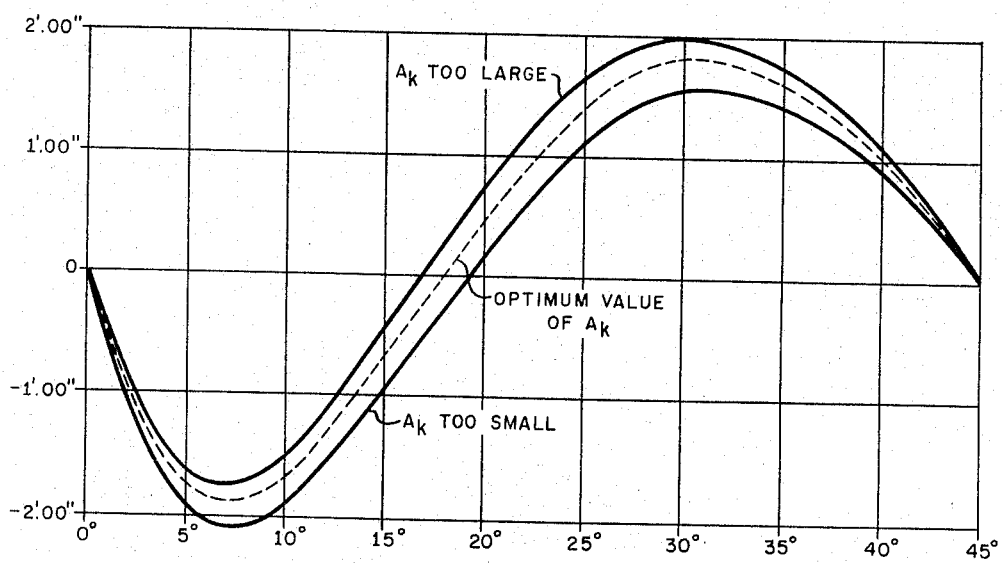

For a more complete understanding of the present invention, reference should be had to the following specification and to the appended figures of which:

FIGURE 1 is a simplified schematic diagram of a typical relay-actuated embodiment of the present invention; and FIGURE 2 is a plot of the angular error characteristic of the embodiment of FIGURE 1 as a function of a certain interrelationship between the parameter values thereof.

Referring to FIGURE 1, an alternating voltage of convenient amplitude is provided by constant voltage source 1. The voltage is applied to one terminal of each of the resistors 2, 3, 4 and 5 of a relay-controlled network. The number of resistors in the network is equal to two less than the number of bits comprising the binary digital input signal generated within command source 6. The reference numeral 6 broadly represents a conventional source of binary digital signals whose individual bits energize respective actuating means (such as relay coils and armatures) for controlling the positions of switches 7, 8, 9 and 10 and for operating network 23. The remaining terminals of the network resistors 2, 3, 4 and 5 are connected to the movable contacts of respective single pole double throw relay actuated switches 7, 8, 9 and 10. A total of four network resistors and four switches is shown in the disclosed embodiment by way of example. It will be noted, however, that the invention is readily adapted for use with digital signals comprising other numbers of bits if desired. Additionally, other digital coding such as a 1, 2, 2, 4 weighted code could be used.

The condition of each of the switches 7, 8, 9 and 10 is determined in accordance with the value of a respective bit of the input signal provided by source 6. In the convention adapted in FIGURE 1, the positions shown for the movable members of the network switches are assumed in the event that the values of the respective bits are zero. Zero values obtain for all the bits whenever the angle being represented is zero degrees, 90 degrees, 180 degrees or 270 degrees. Thus, each quadrant of the 360° total angle represented by the digital input signals is quantized into a number of portions equal to $2^{n-2}$ where $n$ equals the total number of bits comprising the input signal. As will be shown later, the two most significant bits of the input signal represent the quadrant of the angle, not the magnitude of the angle.

Stationary contacts 11, 12, 13 and 14 of the network switches are connected to lead 15 whereas stationary contacts 16, 17, 18 and 19 are connected to lead 20. Output resistors 21 and 22 are connected across leads 15 and 20. The common junction of output resistors 21 and 22 is connected to ground. The admittances of the network resistors 2, 3, 4 and 5 are related to each other in accordance with powers of two. For example, in a representative embodiment of the invention in which a total of 13 bits comprise the digital input signal and a total of 11 network switches and resistors are employed, the resistance value of the resistor 2 corresponding to the least significant digit of the command signal is 409,600Ω. The resistance value of the next high order resistor 3 is 204,800Ω and so on.

In effect, the admittances of the network resistors corresponding to the zero valued bits of the input signal are additively combined on lead 20 whereas the admittances of the network resistors corresponding to the unity valued bits of the input signal are additively combined on lead 15. The closure of any one switch provides a conductive path between the voltage source 1 and ground through resistor 22 if the value of the corresponding bit is zero or through resistor 21 if the value of the corresponding bit is unity. In this manner, paralleled network resistors are connected in series circuit with one or the other of the output resistors 21 and 22 with the voltages resulting across the output resistors being applied to quadrant switching network 23 for application to the appropriate stator winding coils of resolver 24. As a result of the voltage division between network and output resistors, the potentials developed across the output resistors change non-linearly in response to equal increment changes in the value of the digital input signal. The amount of the non-linearity depends upon the interrelationship between the value of the output resistor (including the loading effect thereon by network 23 and the stator coils of resolver 24) and the total value of the network resistors 2, 3, 4 and 5 plus the value of resistor 25. The admittance of resistor 25 is made equal to the admittance of resistor 2. It wil lbe noted that resistor 25 is connected permanently between voltage source 1 and lead 20. Resistor 25 is provided to simplify quadrant switching as will be described later.

Assuming that the value of the digital input signal is zero (representing an angle of 0°), the movable members of switches 7, 8, 9 and 10 will be in contact, respectively, with stationary contacts 16, 17, 18 and 19. In this case, the admittances of resistors 25, 2, 3, 4 and 5 are additively combined to provide a conductive path between voltage source 1 and lead 20 for the energization of output resistor 22. At the same time, there is no conductive path between lead 15 and voltage source 1 whereby output resistor 21 is deenergized. Accordingly, there is developed a maximum potential across output resistor 22 (corresponding to the value of the cosine of 0°) and a zero potential across output resistor 21 (corresponding to the value of the sine of 0°). The vector 28 represents the resulting resolver flux direction.

When the value of the digital input signal is one bit less than exactly one-quarter of its maximum value (representing an angle having a value of one unit less than 90°), the positions of the movable members of the switches are reversed from that shown in the drawing. Accordingly, a conductive path is formed by network resistors 2, 3, 4 and 5 between resistor 21 and voltage source 1. Solely the admittance of resistor 25 provides a current path between resistor 22 and voltage source 1. Thus, the condition is one of almost maximum voltage across resistor 21 and almost minimum voltage across resistor 22. Vector 26 represents the resulting resolver flux direction. When the value of the digital command signal increases by one additional unit, all of the switch movable arms revert to the position shown in the drawing causing a maximum voltage to appear across resistor 22 and a zero voltage across resistor 21. However, the value of the second most significant digit changes from zero to unity at the same time to actuate quadrature switching network 23 so as to interchange the application of the output resistor voltages to the stator windings of resolver 24. In addition, the poling of one of the windings is reversed. The result is that the resultant flux vector represented by arrow 26 is caused to rotate counterclockwise through one angular unit to the position of arrow 27 to complete the flux rotation through the first quadrant. Quadrature switching network 23 and the response thereof to changing values of the two most significant digits of the digital input signal are described in detail in the aforementioned Patent No. 3,134,098.

The alternating magnetic field produced by the energized stator windings induces a voltage in the rotor winding 29 of resolver 24. The induced voltage is amplified in amplifier 30 and then applied to servomotor 31. Motor 31 drives rotor winding 29 via shaft 32 to that angular position at which the voltage induced in the rotor winding reduces to zero. In the steady state condition, the position of shaft 32 is the analog equivalent of the angle represented by the digital input signal provided by source 6.

Resistor 25 facilitates quadrature switching without the introduction of angular error. This can best be seen by assuming that resistor 25 is omitted and the the movable switch members are at positions opposite to those shown in response to unit valued digits 2° to $2^{n-3}$. The assumed case would result in the production of a maximum voltage across resistor 21 and a zero voltage across resistor 22. In response to a unit increase in the value of the digital input signal, the aforesaid lower significant digits thereof would revert to zero value whereupon a maximum voltage would appear across resistor 22 and a zero voltage would appear across resistor 21. The simultaneous actuation of th eswitching network 23 would negate the interchanging of the voltage values across resistors 21 and 22 with the undesired result that the flux vector generated within the resolver would not move. In other words, the flux vector position would remain the same for two adjacent values of the digital command signal. A second increment in the value of the digital input signal would be required for th eflux vector to continue its rotation. The effect is that the flux vector would slip one angular unit behind the angle represented by the digital command signal as the first quadrant boundary (at 90°) is traversed. The same result would obtain on each successive quadrant boundary traversal. The cumulative effect of several quadrant boundary traversals in the same direction would introduce serious angular disagreement between the direction of the flux vector in the resolver and the angle represented by the digital input command signal.

It has been found that although the voltage approximations of sine and cosine generated across output resistors 21 and 22 are not free from appreciable error, the ratio of the sine voltage to the cosine voltage can be made to approximate the value of the tangent of the angle represented by the digital input signal to a very high degree of precision. It is to be noted that the angular accuracy of the digital signal to shaft angle conversion system of FIG. 1 depends solely upon the accuracy with which the tangent function is produced and is unaffected by inaccuracies in the individual sine and cosine functions. The disagreement between the generated tangent value and the actual tangent value of the angle represented by the digital input signal can be reduced to within ±two minutes of arc by satisfying the relationship:

$$1.801 = \frac{A_k}{\Sigma A_s + \Sigma A_c}$$

wherein $A_k$ represents the admittance of either one of equal valued resistors 21 and 22 (including all loading effects thereon by virtue of the connection of the resolver stator winding established via network 23), and $\Sigma A_s + \Sigma A_c$ represents the total admittance of all of the resistors 25, 2, 3, 4, and 5.

FIGURE 2 shows graphically how the disagreement between generated tangent and actual tangent values varies as a function of programmed digital values of angle and as a function of deviations from the value 1.801 in the above expression. It will be seen by reference to FIGURE 2 that minimum error is achieved between the generated and actual tangent values when the value of the ratio $$\frac{A_k}{\Sigma A_s + \Sigma A_c}$$

is made equal to 1.801. The error curves plotted in FIGURE 2 are cyclic and repeat every 45° over the same values shown in the plots.

It will be noted that the contact resistances of each of the network switches are connected in parallel with respect to each other. Thus, the total contact resistance in circuit is never more than the resistance of a single contact and becomes reduced if two or more contacts are placed in parallel. The desirable consequence of this is that the value of the smallest network resistor can be reduced relative to the value that would be required were the switches arranged in series circuit rather than parallel circuit relationship with respect to each other. In the series circuit arrangement of the aforementioned patent, for example, the value of the smallest network resistor must exceed the value of the total contact resistance of all the network switches in series circuit. This appreciably increases the value of the largest network resistor inasmuch as the resistor values must be related to each other in accordance with powers of two. The result is that the present invention provides for a minimum impedance in the conversion network, which, together with the simple switching arrangement, minimizes detrimental cross-coupling and quadrature effects due to stray capacitance between the sine and cosine signals whereby each may be produced without the influence of the other.

It should be noted that a constant current alternating signal source may be substituted for constant voltage alternating signal source 1 in the configuration of FIG. 1 without affecting the accuracy with which shaft 32 represents the angle of the digital input signal.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. Apparatus comprising
   a plurality of first impedances having admittances proportional to the weights of respective digits of a digital input signal, said impedances being connected together at one end,
   a pair of output impedances,
   a plurality of two mode switching means for connecting the other end of respective ones of said first impedances to one end of one of said output impedances when in the first mode and for connecting said other end of respective ones of said first impedances to one end of the other of said output impedances when in the second mode,
   a second impedance having an admittance equal to the smallest admittance of said first impedances,
   said second impedance being connected between said one end of said first impedances and said one end of one of said output impedances,
   a source of said digital input signal coupled to said plurality of two mode switching means, the mode of each said switching means being determined by the value of a corresponding digit of said digital input signal, and
   means for coupling the other end of each of said output impedances to said one end of said first impedances,
   a load, and
   quadrant switching means coupled to receive digits of said digital input signal other than the digits which determine the modes of said switching means,
   said quadrant switching means selectively coupling said output impedances to said load in accordance with the values of said other digits.

2. Apparatus as defined in claim 1 wherein said means for coupling includes a source of constant amplitude signal.

3. Apparatus as defined in claim 2 wherein said source of constant amplitude signal is a constant current source.

4. Apparatus as defined in claim 2 wherein said source of constant amplitude signal is a constant voltage source.

5. Apparatus comprising
   a plurality of first resistors having admittances proportional to the weights of respective bits of a binary input signal, said resistors being connected together at one end,
   a pair of output resistors,
   a plurality of two mode switching means for connecting the other end of respective ones of said first resistors to one end of one of said output resistors when in the first mode and for connecting said other end of respective ones of said first resistors to one end of the other of said output resistors when in the second mode,
   a second resistor having an admittance equal to the smallest admittance of said first resistors,
   said second resistor being connected between said one end of said first resistors and said one end of one of said output resistors,
   a source of said binary input signal coupled to said plurality of two mode switching means, the mode of each said switching means being determined by the value of a corresponding bit of said binary input signal,
   means for coupling the other end of each of said output resistors to said one end of said first resistors,
   a load, and
   quadrant switching means coupled to receive digits of said digital input signal other than the digits which determine the modes of said switching means,
   said quadrant switching means selectively coupling said output resistors to said load in accordance with the values of said other digits.

6. Apparatus as defined in claim 5 wherein said means for coupling includes a constant voltage source.

7. Apparatus as defined in claim 5 wherein said means for coupling includes a constant current source.

8. Apparatus comprising
a plurality of first resistors having admittances proportional to the weights of respective bits of a binary input signal, said resistors being connected together at one end,
a pair of output resistors,
a plurality of two mode switching means for connecting the other end of respective ones of said first resistors to one end of one of said output resistors when in the first mode and for connecting said other end of respective ones of said first resistors to one end of the other of said output resistors when in the second mode,
a second resistor having an admittance equal to the smallest admittance of said first resistors,
said second resistor being connected between said one end of said first resistors and said one end of one of said output resistors,
a source of said binary input signal coupled to said plurality of two mode switching means, the mode of each said switching means being determined by the value of a corresponding bit of said binary input signal, and
a source of constant amplitude signal coupled between the other ends of said output resistors and said one end of said first resistors,
a load, and
quadrant switching means coupled to receive digits of said digital input signal other than the digits which determine the modes of said switching means,
said quadrant switching means selectively coupling said output resistors to said load in accordance with the values of said other digits.

9. Apparatus as defined in claim 8 wherein said constant amplitude signal is an alternating signal of constant amplitude,
and said load comprises a resolver having quadrature windings.

10. Apparatus as defined in claim 8 wherein the ratio of one of said output resistors to the total resistance of said first resistors is substantially 1.801.

References Cited
UNITED STATES PATENTS

| | | | |
|---|---|---|---|
| 3,201,778 | 8/1965 | Porter et al. | 340—347 |
| 3,241,133 | 3/1966 | Herzl | 340—347 |

DARYL W. COOK, *Acting Primary Examiner.*

MAYNARD R. WILBUR, *Examiner.*

A. L. NEWMAN, *Assistant Examiner.*